(12) United States Patent
Underhill

(10) Patent No.: US 8,390,220 B2
(45) Date of Patent: Mar. 5, 2013

(54) DEVICE FOR CONTROLLING REGENERATION ENERGY IN AN ELECTRONIC MOTOR DRIVE HAVING AN LC FILTER TO REDUCE CONDUCTED EMISSIONS FROM THE MOTOR BACK TO THE VOLTAGE SOURCE

(75) Inventor: Mark J. Underhill, East Aurora, NY (US)

(73) Assignee: Moog Inc., East Aurora, NY (US)

( * ) Notice: Subject to any disclaimer, the term of this patent is extended or adjusted under 35 U.S.C. 154(b) by 135 days.

(21) Appl. No.: 12/865,444

(22) PCT Filed: Feb. 1, 2008

(86) PCT No.: PCT/US2008/001431
§ 371 (c)(1), (2), (4) Date: Nov. 30, 2010

(87) PCT Pub. No.: WO2009/096926
PCT Pub. Date: Aug. 6, 2009

(65) Prior Publication Data
US 2011/0074319 A1    Mar. 31, 2011

(51) Int. Cl.
*H02P 3/14* (2006.01)

(52) U.S. Cl. .......... 318/376; 318/375; 318/362
(58) Field of Classification Search .......... 318/376, 318/375, 362
See application file for complete search history.

(56) References Cited

U.S. PATENT DOCUMENTS

| | | | |
|---|---|---|---|
| 4,947,309 A * | 8/1990 | Jonsson | 363/17 |
| 5,402,331 A * | 3/1995 | Takahashi et al. | 363/89 |
| 7,035,118 B2 * | 4/2006 | Jonsson | 363/17 |

* cited by examiner

*Primary Examiner* — Walter Benson
*Assistant Examiner* — David Luo
(74) *Attorney, Agent, or Firm* — Phillips Lytle LLP

(57) ABSTRACT

The present invention provides a unique improvement (23) in an electronic motor drive (20) having an LC filter (21) to reduce conducted emissions from a motor (M) back to a voltage source (V1). The improvement broadly includes diode (24) in series with the inductor (L1) of said filter to prevent transmission of regenerative power from the motor to said voltage source; and a bypass switch (25) arranged in parallel with the diode and selectively operable to enable transmission of regenerative power from the motor to said voltage source.

7 Claims, 3 Drawing Sheets

DEVICE FOR CONTROLLING REGENERATION ENERGY IN AN ELECTRONIC MOTOR DRIVE HAVING AN LC FILTER TO REDUCE CONDUCTED EMISSIONS FROM THE MOTOR BACK TO THE VOLTAGE SOURCE

TECHNICAL FIELD

The present invention relates generally to the field of electronic motor drives, and, more particularly, to an improved electronic motor drive having an LC filter to reduce conducted emissions from the motor back to the voltage source.

BACKGROUND ART

A high-power motor drive requires a low-output impedance filter in order to provide responsive control of the motor, particularly when four-quadrant operation is required (i.e., when both motoring and generating must be addressed). When the drive is also constrained with conducted emissions requirements, it must also contain sufficient input impedance, typically provided with one or more input inductors, to adequately reduce drive-induced ripple current. This requirement in turn forces the designer to provide adequate filter damping to ensue that the motor drive or the input bus do not stimulate filter oscillations. These opposing requirements force the designer to provide either a physically large input filter or a dissipative filter.

DISCLOSURE OF THE INVENTION

With parenthetical reference to the corresponding parts, portions or surfaces of the disclosed embodiment, merely for purposes of illustration and not by way of limitation, the present invention provides a unique improvement (23) in an electronic motor drive (20) having an LC filter (21) to reduce conducted emissions from a motor (M) back to a voltage source (V1).

The improvement broadly includes diode (24) in series with the inductor (L1, L2) of the filter to prevent transmission of regenerative power from the motor to said voltage source, and a bypass switch (25) arranged in parallel with the diode and selectively operable to enable transmission of regenerative power from the motor to said voltage source.

The switch may be a transistor.

The improvement may further include a freewheeling diode (26) arranged to allow inductor current flow when the switch is turned off.

The LC filter may be underdamped, with more than 6 dB of peaking in the frequency domain.

The switch may be controlled as a function of the voltage across the diode and the inductor, or as a function of the development of regenerative power, or as a function of a comparison between the input voltage and the output voltage, or by some other means.

Regenerative power may be used to operate the switch.

Accordingly, the general object of the invention is to provide an improvement for use in an electronic motor drive having an LC filter to reduce conducted emissions from a driven motor back to a voltage source.

Another object is to provide an improved electronic motor drive having an output impedance that is sufficiently low for four-quadrant operation, while simultaneously providing adequate input impedance to attenuate conducted emissions.

These and other objects and advantages will become apparent from the foregoing and ongoing written specification, the drawings and the appended claims.

DESCRIPTION OF THE PREFERRED EMBODIMENTS

Figure 1:
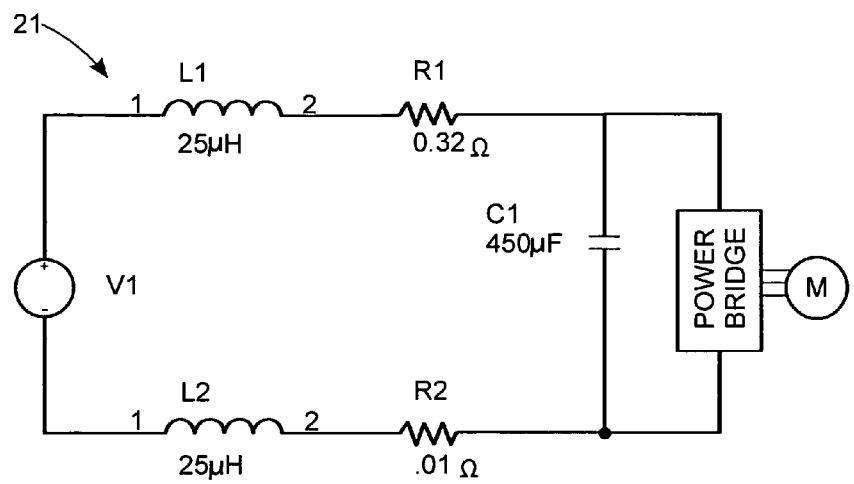
FIG. 1 is a simplified electrical schematic of a series-damped prior art input filter in association with a motor.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Referring now to the drawings, the present invention broadly provides an improvement (23) for use in an electronic motor drive (20) having an LC filter (21) to reduce conducted emissions from a motor (M) back to a voltage source (V1). However, in order to better understand the invention in the context of the prior art, a prior art filter will now be described to better illustrate the problems in the prior art.

Prior Art Filter (FIGS. 1-4)

FIG. 1 is a simplified electrical schematic of an input filter, generally indicated at 20, in association with a first motor M. The input filter includes a voltage source V1. The opposing terminals of the voltage source are connected by a 25 μH inductor L1, a 0.32 Ω resistor R1, a 450 μF capacitor C1, a 0.01 Ω resistor R2, and a second 25 μH inductor L2. The motor power bridge is connected to the node between resistor R1 and capacitor C1, and the node between capacitor C1 and resistor R2

Figure 2:
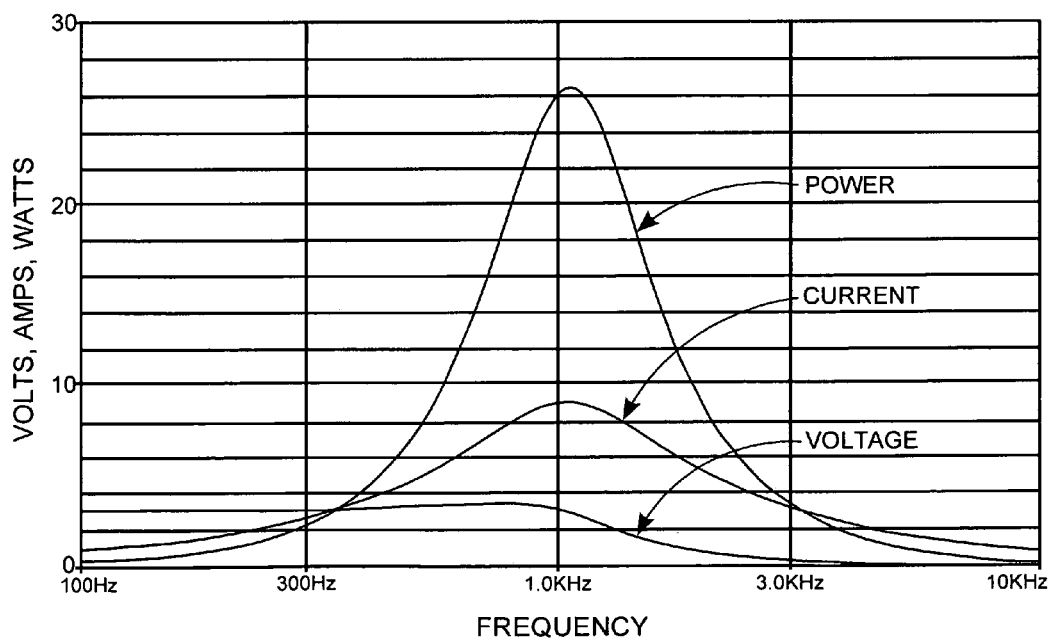
FIG. 2 is a plot of voltage, current and power (ordinate) vs. frequency (abscissa) dissipated by resistor R1 for the circuit shown in FIG. 1 for a 3V AC input.

FIG. 2 is a plot showing the voltage, the current and the power lost through resistor R1 in FIG. 1, as a function of frequency in response to a 3 volt current input ripple. While the voltage is shown as tailing off towards zero as frequency increases, the current is shown as raising to a maximum at just more than 1.0 KHz. However, the power loss in resistor R1 is shown as rising to a maximum value at about the same frequency as that of the maximum current.

Figure 3:
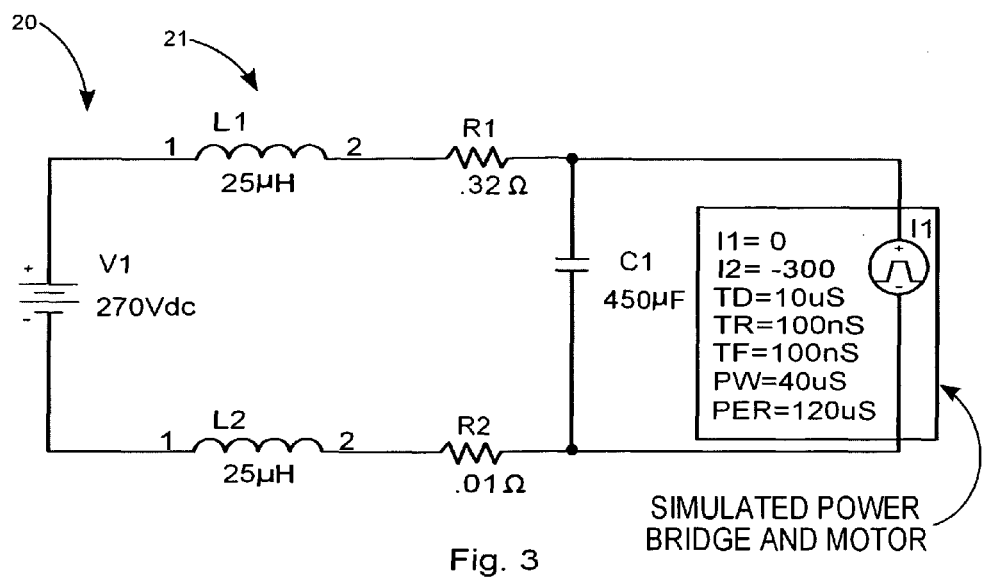
FIG. 3 is a simplified electrical schematic of the same series-damped prior art input filter.

FIG. 3 is a simplified electrical schematic showing the same input filter with a simulated power bridge and motor. More particularly, the motor is shown as having a 300 ampere motor drive operating at ⅓ duty.

Figure 4:
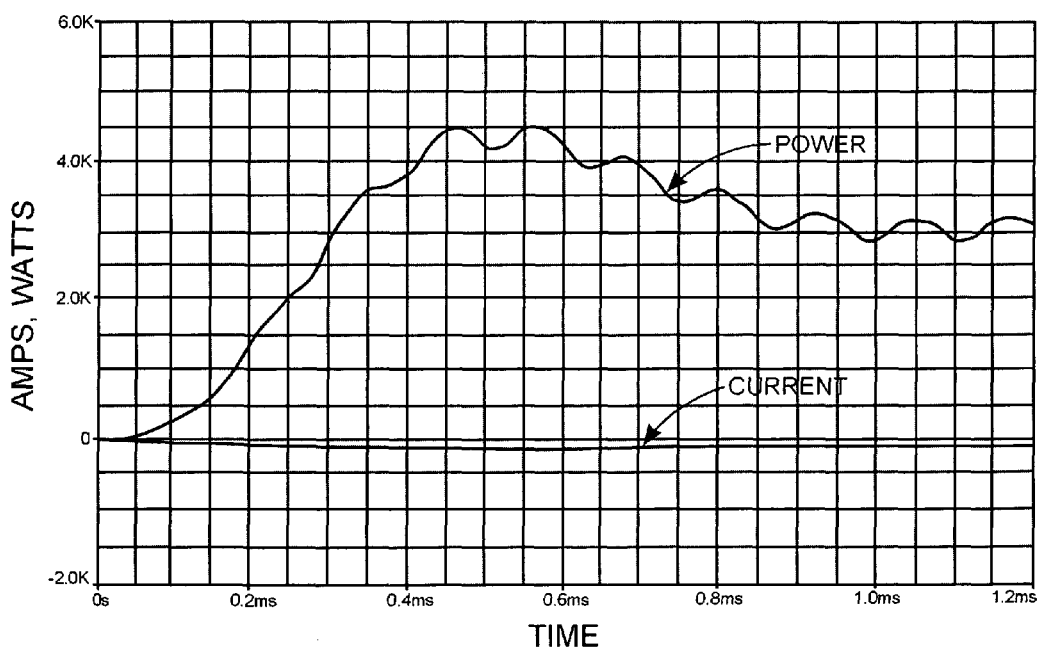
FIG. 4 is a plot of current and power (ordinate) dissipated by resistor R1 vs. time (abscissa) for the circuit shown in FIG. 3 when analyzed with a 100 ampere equivalent load.

FIG. 4 is a plot of the current and power through resistor R1 for the schematic shown in FIG. 3. The power dissipated through the resistor is shown as rising quickly to a value in excess of 4 kilowatts, and remaining at a high level thereafter.

There are a variety of other damping means, but each requires a significant trade-off. For example, the input inductor can be reduced, while the output capacitance is increased, in order to reduce the resulting damping resistance. Unfortunately, this will result in a physically-large filter that can pull substantial currents when exposed to input ripple voltages or transients. Parallel capacitive damping (i.e., adding a resistor in series with a capacitor in parallel to the main capacitor) also results in a physically-larger filter and/or high power dissipation. Resonant damping (in parallel with either the output capacitance or the input inductors) also trades damping versus size and adds component complexity.

Figure 5:
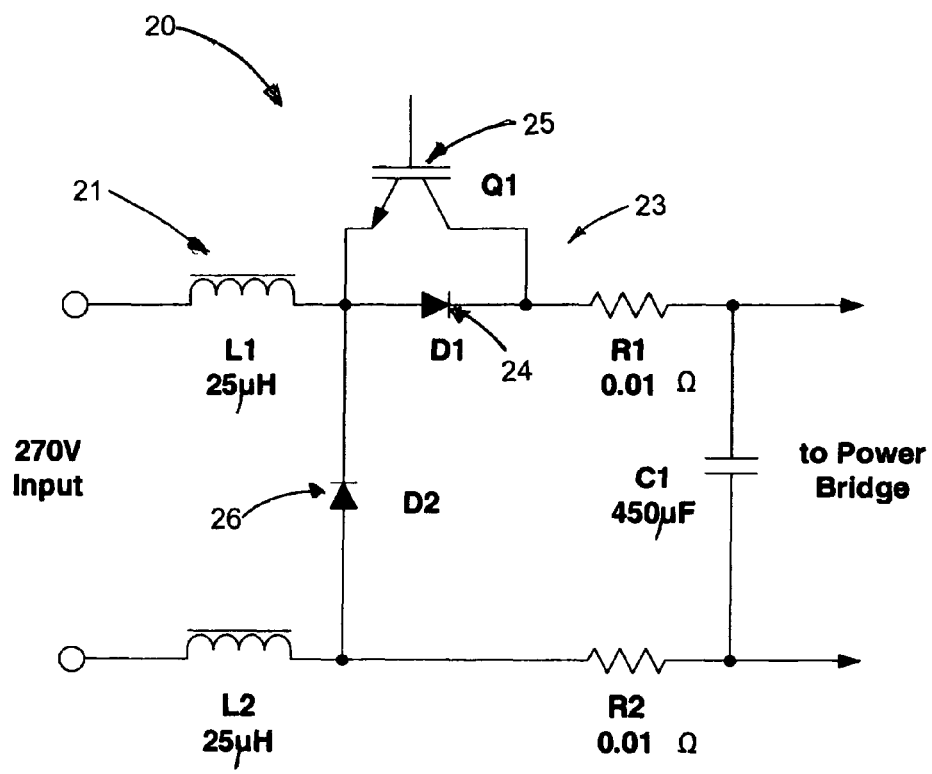
FIG. 5 is a simplified electrical schematic of an improved LC input filter, which includes the diode to prevent transmission of regenerative power from the motor to the voltage source, and the bypass switch arranged in parallel with the diode and selectively operable to enable transmission of regenerative power from the motor to the voltage source.
Figure 6:
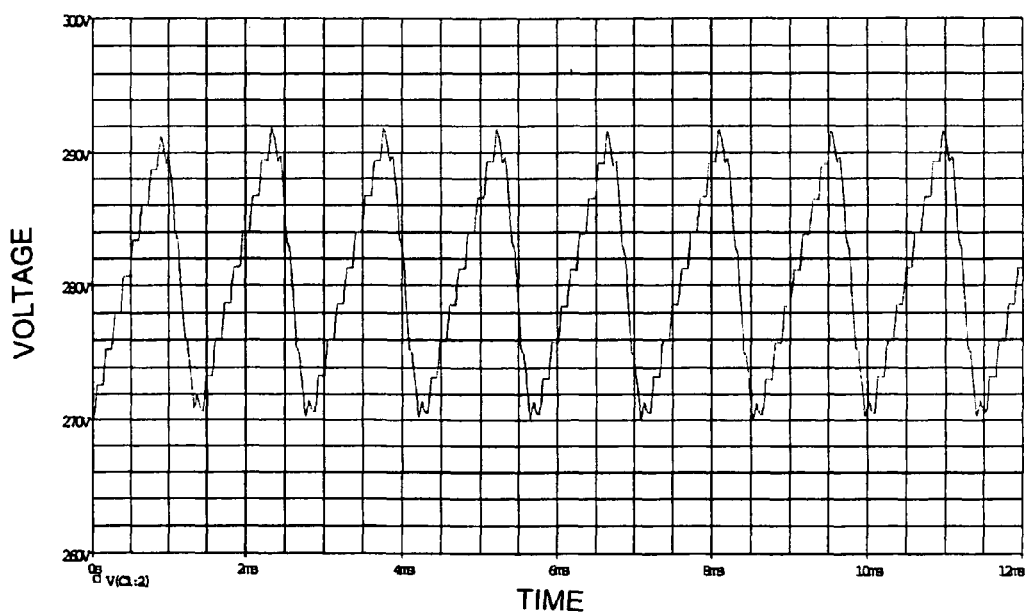
FIG. 6 is a plot of output voltage (ordinate) vs. time (abscissa) for the circuit shown in FIG. 5.

Improved Filter (FIGS. 5 and 6)

FIG. 5 is a schematic of the LC filter shown in FIGS. 1 and 3, as improved by the present invention. The same character symbols previously described are again used to identify like structure in FIG. 5. However, the improvement includes a diode 24 that has been placed in series with capacitor L1 and resistor R1 to prevent the transmission of regenerative power from the motor back through resistor R1 and inductance L1 to the voltage source. In addition to this, a transistor switch 25 has been placed in parallel with diode 24. This switch may be used to selectively allow regenerative power to bypass diode 24 and be fed back to the voltage source. In addition, FIG. 5 shows a freewheeling diode 26 as being operatively arranged between the node positioned between inductor L1 and diode 24, and between inductor L2 and resistor R2. This freewheeling diode 26 is arranged to allow inductor current flow when the switch 25 is turned off.

Switch 25 may be a transistor switch, if desired. The improved filter may be poorly damped, which allows it to be smaller and lighter and/or more efficient than it would otherwise be. Switch 25 may be controlled as a function of the voltage across the diode, as a function of the development of regenerative power, or as a function of a comparison between the input voltage and the output voltage, or by some other means, as desired. Regenerative power may be used to operate the switch.

FIG. 6 is a plot of voltage (ordinate) versus time (abscissa) for the LC filter as shown in FIG. 5. This shows the voltage as building from about 270 volts to about 290 volts during the generation phase, and then following back to about 270 volts during the generation phase.

Therefore, while a preferred form of the improved drive has been shown and described, and several modifications thereof discussed, persons skilled in this art will readily appreciate that other changes and modifications may be made without departing from the spirit of the invention, as defined and differentiated by the following claims.

What is claimed is:

1. In an electronic motor drive having an LC filter to reduce conducted emissions from a motor back to a voltage source, the improvement comprising:
    a diode in series with the inductor of said filter to prevent transmission of regenerative power from said motor to said voltage source; and
    a bypass switch arranged in parallel with said diode and selectively operable to enable transmission of regenerative power from said motor to said voltage source; and
    wherein said LC filter is underdamped with more than 6 dB of peaking in the frequency domain.

2. The improvement as set forth in claim 1 wherein said switch is a transistor.

3. The improvement as set forth in claim 1, and further comprising:
    a freewheeling diode arranged to allow inductor current flow when said switch is turned off.

4. The improvement as set forth in claim 1 wherein said switch is controlled as a function of the voltage across said diode and said inductor.

5. The improvement as set forth in claim 1 wherein said switch is controlled as a function of the development of regenerative power.

6. The improvement as set forth in claim 1 wherein said switch is controlled as a function of a comparison between the input voltage and the output voltage.

7. The improvement as set forth in claim 1 wherein regenerative power is used to operate said switch.

* * * * *